Jan. 6, 1970 KARL-ULRICH STEIN 3,488,639
MAGNETIC THIN-LAYER STORAGE ELEMENT HAVING INTERLAYERS OF INHOMOGENEOUS LAYER THICKNESS
Filed Sept. 7, 1965
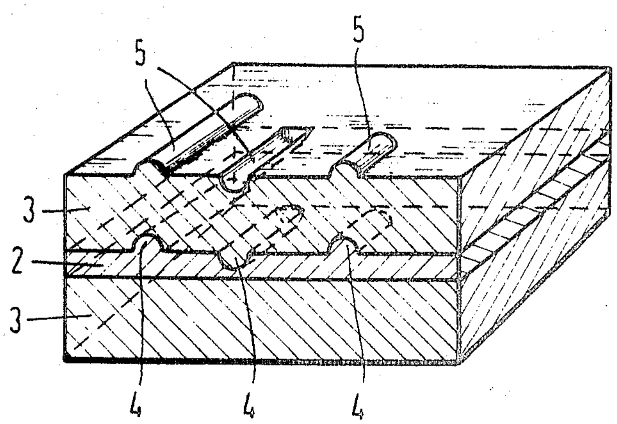
INVENTOR
Karl-Ulrich Stein
BY Hill, Sherman, Meroni, Gross & Simpson ATTYS.

United States Patent Office 3,488,639

Patented Jan. 6, 1970

3,488,639

MAGNETIC THIN-LAYER STORAGE ELEMENT HAVING INTERLAYERS OF INHOMOGENEOUS LAYER THICKNESS

Karl-Ulrich Stein, Munich, Germany, assignor to Siemens Aktiengesellschaft, a German corporation Filed Sept. 7, 1965, Ser. No. 485,244
Claims priority, application Germany, Sept. 8, 1964, S 93,016
Int. Cl. G11b 5/00
U.S. Cl. 340—174 2 Claims

ABSTRACT OF THE DISCLOSURE

An interlayer having an inhomogeneous layer thickness is provided in a magnetic thin-layer storage element with the inhomogeneities lying parallel in their linear dimensions to the magnetically heavy axis of the magnetic layers and having a thickness of 0.2 to 5 of the magnetic layers to minimize wall creeping.

The invention relates to a magnetic thin-layer storage element with several magnetic layers lying one upon another in a stacked formation and in each case separated from one another by non-magnetic interlayers, whereby the magnetic layers are magnetically anisotropic.

There has already been proposed a memory element in which the lower threshold of the magnetic field for the coherent rotation and the upper threshold-field for the reversible magnetization rotation lie so close together that thereby a coincident organization of several storage elements can be realized, or that the manufacturing tolerances for a word-organized memory can be maintained more easily than heretofore. Such storage element has, at least in part, electrically conducting and nonmagnetic interlayers.

The present invention provides a further improvement of such a storage element and proceeds with the concept that in such element the magnetic domain wall prefers zones of the magnetic layers in which the adjacent interlayer is thick and thereby an additional field strength is necessary in order to move the wall beyond zones in which the interlayer has a lesser thickness. The wall is influenced by the average thickness over an area which corresponds to about its own extent.

For the achievement of this improvement the invention provides interlayers which are inhomogeneous in their layer thickness, the layer thickness inhomogeneities of which lie parallel in their linear dimensions to the magnetically hard axis of the magnetic layers on the order of magnitude of the wall thickness, for example their 0.2 to 5 multiple, and perpendicular thereto they exceed the same, preferably by a large multiple. This magnetic thin-layer storage element to a great extent answers the requirement for a prevention of "wall creeping."

The interlayers of the magnetic thin-layer storage element are produced according to the invention by oblique evaporation of the interlayer material on the one surface of the magnetic layers serving as underlayer. The planes of incidence for the evaporating of the interlayers are thereby aligned substantially parallel to the final direction of the hard axis of the magnetic layers to be produced by evaporation. Angular deviations of the abovementioned planes of incidence from the hard axis of, for example 10° do not lead to any impairment of the advantages achieved through utilization of the invention.

In one example of construction it has proved, for example, that in the case of evaporating the interlayers onto the magnetic layers serving as carrier underlayer of the non-magnetic layers with an angle of incidence above 70°, the requirements for the layer-thickness inhomogeneities according to the invention are perfectly fulfilled. A further improved thin-layer storage element in the sense of the invention is obtained if the interlayers are evaporated at a lower temperature than the magnetic layers.

A thin-layer storage element produced according to the present invention is represented in the drawing, in which the numeral 2 designates a non-magnetic interlayer and the numeral 3 deisgnates the magnetic layers.

Changes may be made within the scope and spirit of the appended claims which define what is believed to be new and desired to have protected by Letters Patent.

I claim:

1. In a magnetic thin-layer storage element with several magnetic layers having a preferential direction of magnetization, disposed in stacked formation, one upon the other, and separated from one another in each case by at least partially electrically conducting non-magnetic innerlayers, the combination of innerlayers which are inhomogeneous in their layer thickness, whose layer-thickness inhomogeneities lie in their linear dimensions parallel to the magnetically heavy, axis of the magnetic layers, wherein the thickness ratio of the interlayer to a magneitc layer is about 0.2 to 5 in the direction parallel to the magnetically heavy axis and at least the same ratio in the direction perpendicular to said heavy axis.

2. A magnetic thin-layer storage element according to claim 1, wherein the linear dimensions of the layer thickness inhomogeneities in the direction of the hard axis correspond about to the wall thickness.

References Cited

UNITED STATES PATENTS

| | | | |
|---|---|---|---|
| 3,140,471 | 7/1964 | Fuller | 340—174 |
| 3,125,743 | 3/1964 | Pohm et al. | 340—174 |
| 3,110,613 | 11/1963 | Beam | 117—71 |
| 3,055,770 | 9/1962 | Sankuer et al. | 117—71 |
| 3,071,755 | 1/1963 | Howard | 340—174 |
| 3,019,125 | 1/1962 | Eggenberger. | |
| 3,055,770 | 9/1962 | Sankuer et al. | |
| 3,230,515 | 1/1966 | Smaller. | |
| 3,248,713 | 4/1966 | Middelhock. | |
| 3,188,613 | 6/1965 | Fedde. | |
| 3,175,201 | 3/1965 | Slonczewski. | |

OTHER REFERENCES

Publication I: IBM Technical Disclosure Bulletin, "Preparation of Adherent Thin Magnetic Films by Chemical Reduction" by Tsu; vol. 2 No. 3; October 1959, 340-174TF, p. 36.

STANLEY M. URYNOWICZ, JR., Primary Examiner

U.S. Cl. X.R.

117—71